L. T. OWENS.
NEST AND SEGREGATING DEVICE.
APPLICATION FILED APR. 27, 1911.
1,053,433.
Patented Feb. 18, 1913.
3 SHEETS—SHEET 1.
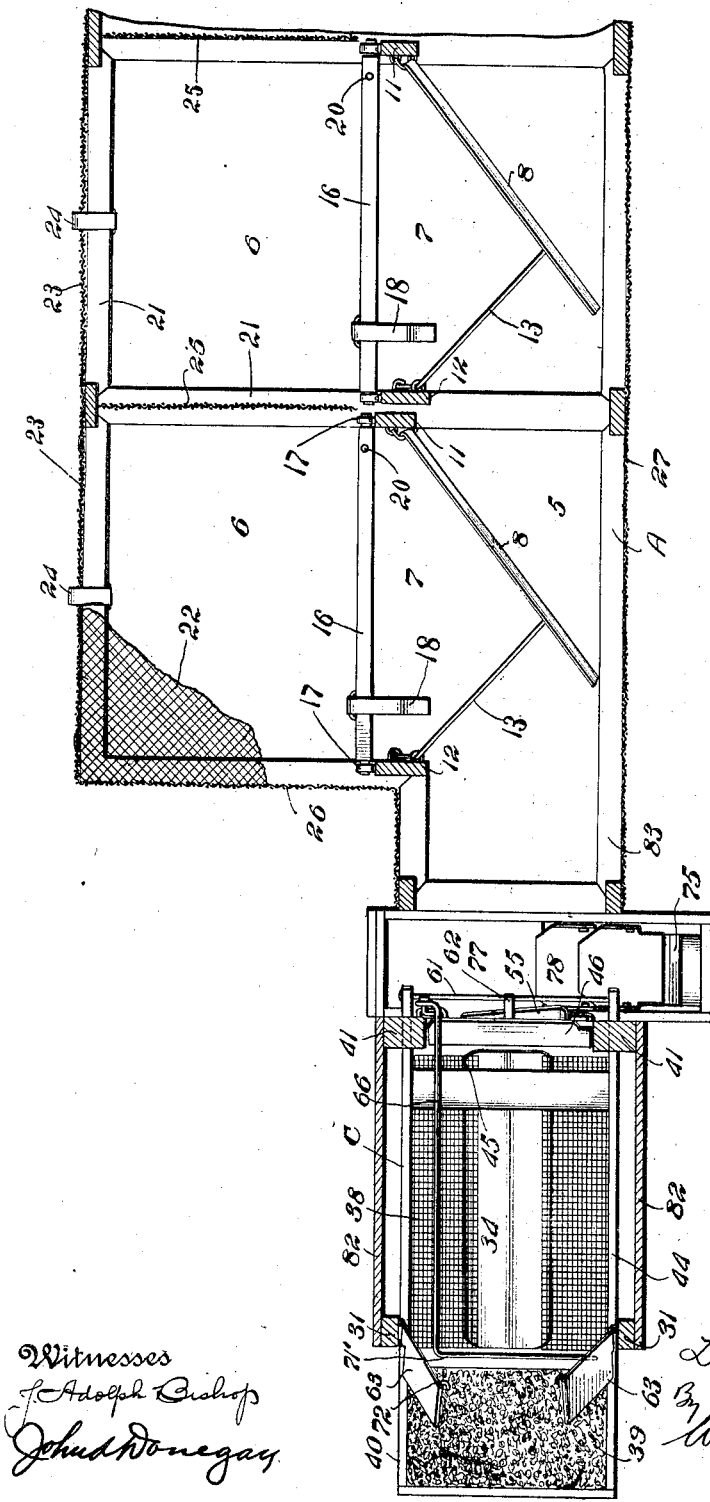

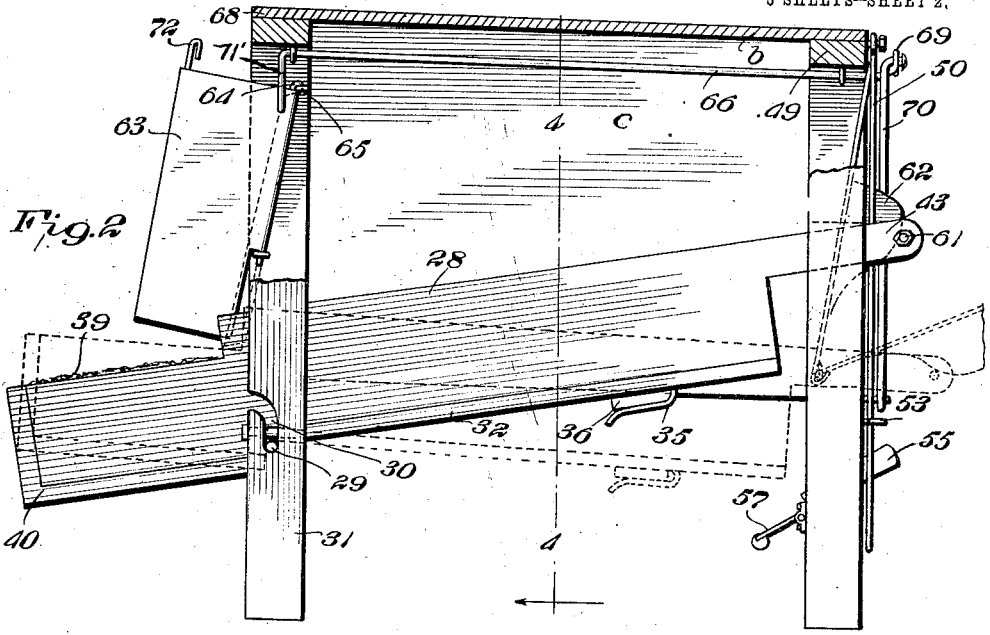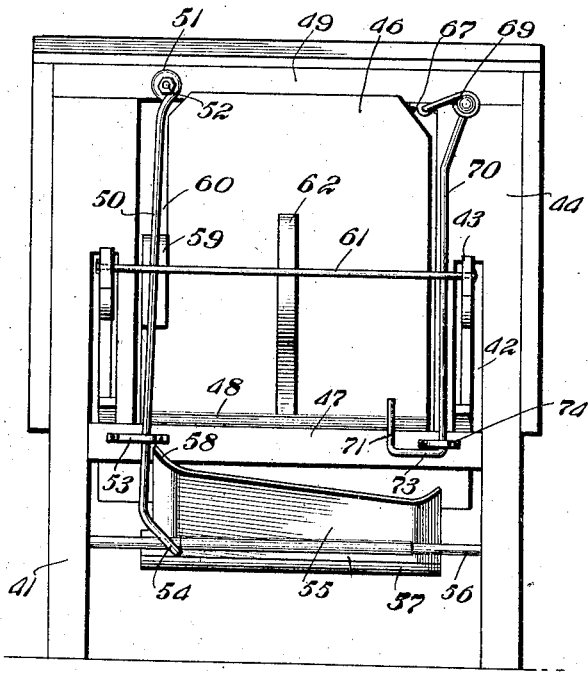

L. T. OWENS.
NEST AND SEGREGATING DEVICE.
APPLICATION FILED APR. 27, 1911.
1,053,433.
Patented Feb. 18, 1913.
3 SHEETS—SHEET 3.
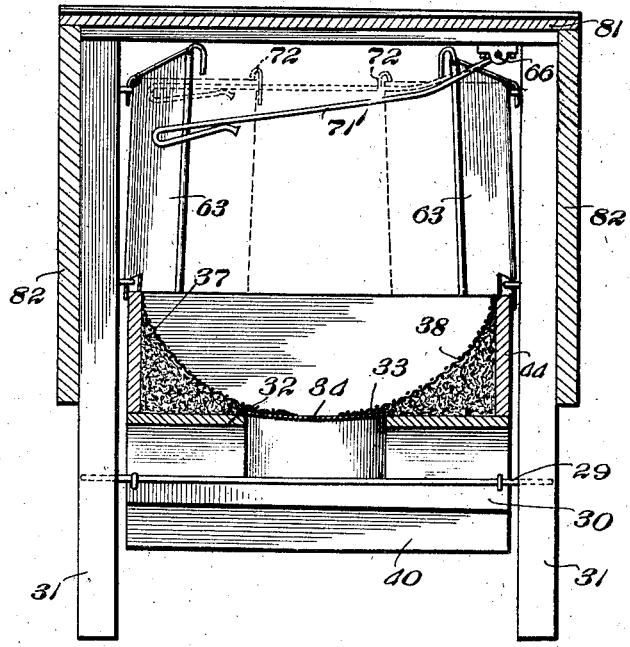
Fig. 4.
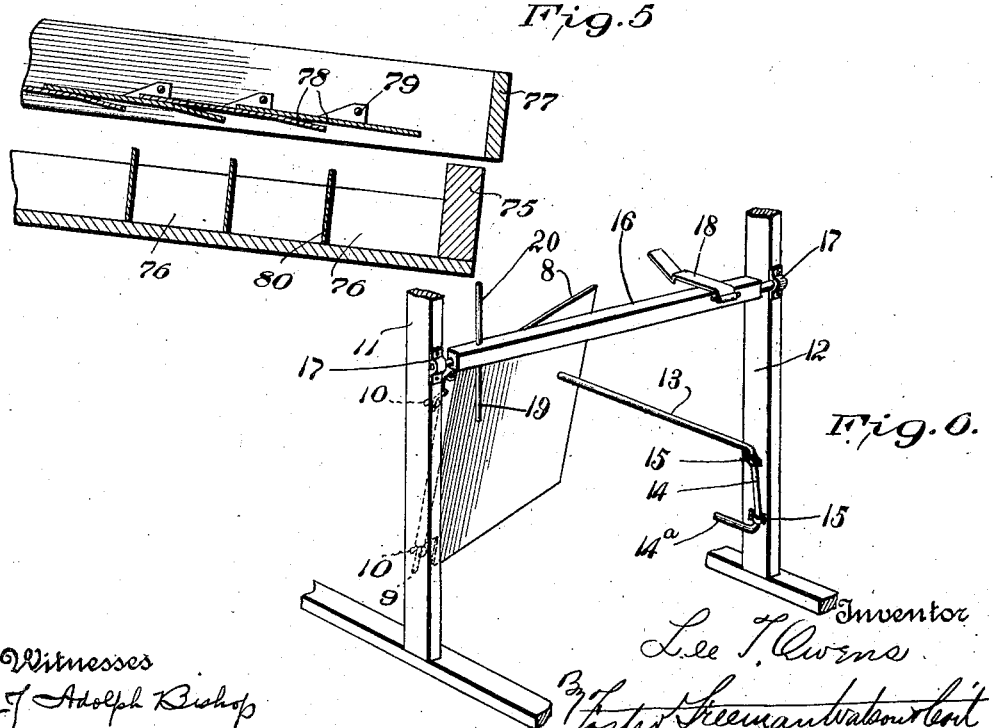
Fig. 5.
Fig. 6.
Witnesses
J Adolph Bishop
John A Donegan
Inventor
Lee T. Owens
By Foster Freeman Watson Kent
Attorneys

UNITED STATES PATENT OFFICE.

LEE T. OWENS, OF TACOMA, WASHINGTON.

NEST AND SEGREGATING DEVICE.

1,053,433.  Specification of Letters Patent.  Patented Feb. 18, 1913.

Application filed April 27, 1911. Serial No. 623,767.

*To all whom it may concern:*

Be it known that I, LEE T. OWENS, a citizen of the United States, and resident of Tacoma, county of Pierce, State of Washington, have invented certain new and useful Improvements in Nest and Segregating Devices, of which the following is a specification.

One object of this invention is the provision of a device for segregating laying fowls and ascertaining the egg laid by each fowl.

Other objects will appear and be better understood from the following description taken in connection with the accompanying drawings, in which:

Figure 1 is a sectional plan view of the device. Fig. 2 is a detail side elevation partly in section of the nest member. Fig. 3 is a front elevation of the exit end of the nest member. Fig. 4 is a sectional end view on the line 4—4 of Fig. 2 in the direction of the arrow. Fig. 5 is a sectional detail of the egg separator. Fig. 6 is a detail in perspective of one of the compartment closures and means for holding the same in open position.

Referring to the drawing A indicates the segregating device which is formed with a runway 5 of any desired length and a plurality of pens 6 into which the individual hens are directed. Each compartment 6 has a doorway 7 opening into the runway provided with a self-closing door 8. As shown the door is provided with hinges arranged on an inclined line which causes it to constantly tend to swing to a closed position. The particular hinges illustrated comprise hooks 9 on the door which fit into staples 10 on the door post 11.

The door 8 is normally held open by a prop 13 which is hinged to the door post 12 and which constantly tends to swing outward to hold the door open. The prop 13 is shown in the form of an angular wire, the middle portion 14 of which passes through staples or brackets 15 arranged on an inclined line on the post 12. A short arm 14ᵃ coöperates with the post 12 to limit the outward movement of the arm 13 so that it will stop in the position shown in Figs. 1 and 6 in which it is best adapted to hold the door 8 open.

Above the door 8 is a bar 16 adapted to rock on pivots which are mounted in brackets or bearings 17 in the posts 11, 12. The bar 16 carries a latch 18 which the door 8 normally lifts as it closes and which locks the door in closed position. The latch 18 rests on the top of the bar whereby when the bar is rocked the latch will be raised to free the door. Near the post 11 the bar 18 is provided with a downwardly extending arm 19 and with an upwardly extending arm 20. The arm 19 is adapted to contact with and open the door 8 when the bar is rocked by the arm 20.

The construction of the segregating devices is as follows: The pens or compartments 6 are each of sufficient size to hold a hen comfortably. They may be constructed of any suitable material. As shown they are constructed of light framework 21 covered on the top with wire netting 22. The partitions 25 and the end wall 26 may be of similar material. Each pen is provided with an outlet door 23 which is normally closed by a latch 24 connected to the upper frame piece 21. The doors 23 are shown as made of wire netting and they are suitably hinged to the bottom of the framework. The outside wall and top of the runway 5 are also covered with wire netting 27.

The runway is connected up to a nest to be hereinafter described and its operation is as follows: The arms 20 are all operated to open the doors 8 and the props 13 swing out by gravity and hold the doors open as shown in Fig. 1. The first hen leaving the nest passes into the runway and is guided by the first door 8 into the first pen. In passing into the pen she pushes the prop 13 in front of her which permits the door 8 to swing to closed position, in which it is retained by the latch 18. The first hen is thus locked in the first pen, and the runway is left free so that the second hen can pass on to the second pen in which she is locked in like manner. The runway 5 may be of any desired length and any desired number of pens may be connected to it in the manner described.

The nest member B comprises a nest 28, one end of which has a cross bar 29 secured to an end portion of the bottom 30. The cross bar 29 has its opposite ends loosely fitted in curved slots 30 formed in the rear uprights 31 of a casing *c*. The bottom 32 of the nest is provided with a longitudinal opening 33 over which is arranged a plate 34 having a hook 35 to engage a cross piece 36 extending across the opening 33. The plate 34 is arranged at the middle portion of the bottom 32 and may be readily detached when it is desired to clean the nest. The interior of the nest is provided with suitable padding 37 covered by concaved strips 38 preferably of meshed wire.

The nest is normally held in an inclined position shown in Fig. 2 by means of weighted material 39 arranged in a receptacle 40 which forms an end extension of the nest and projects beyond the uprights 31. The weight of the material 39 is barely sufficient to maintain the nest in the position shown in Fig. 2 so that when a fowl enters the nest it will move to the position shown by dotted lines in the said figure. The forward uprights 41 of the casing c are provided with slots 42 which freely receive the arm extensions 43 extending forwardly from the forward ends of the sides 44 of the nest 28. The lower ends of the slots form stops for the downward movement of the nest caused by the weight of a fowl thereon, the parts being so constructed that the nest will assume the inclined position shown in dotted lines in Fig. 2 when the fowl is thereon so that an object such as an egg deposited in the nest will readily roll through the open forward end 45 of the nest. The space between the forward uprights 41 is normally closed by a self-opening door 46. The lower end of the door 46 is hinged to a cross piece 47 connecting the uprights 41, the location of the hinge 48 being a trifle inwardly from the plane of the outer surface of an upper cross piece 49 which connects the upper ends of the uprights 41. When the door is in its normally closed position as shown in Figs. 1 and 3 the free upper end will abut against the cross piece 49 and the door will assume the inclined position shown.

The door is held closed by means of a gravity latch 50, one end portion of which has an eye 51 to receive a pivot pin 52 secured to the cross piece 49, the lower end portion of the latch extending through a guide 53 and terminating in a bent portion 54 located below the lower cross piece 47. A platform 55 has a cross bar 56 rotatably mounted in the lower end portions of the uprights 41 and below the lower cross piece 47. The platform 55 is over-balanced by means of a weight 57 secured on the inner side thereof. By virtue of the weight 57 the normal position of the platform will incline upwardly and outwardly as shown in Figs. 2 and 3 and held in this position by means of a curved end portion 58 which abuts against the lower cross piece 47. The bent end portion 54 of the gravity latch 50 is in the path of movement of the curved end portion 58 of the platform, and when the forward end portion of the nest moves downwardly under the weight of a fowl as before described, the inner or weighted side portion of the platform will underlie the open end portion 45 of the nest so that an egg rolling on the bottom of the nest will strike the platform at a point outwardly from the rod 56, thus rocking the platform whereby the curved portion 58 will move into engagement with the portion 54 of the gravity latch and cam the latter to the left in Fig. 3 and out of engagement with the side of the door 46, whereby the latter will move to open position. When the door is open the latch will bear on the side thereof and incline downwardly and laterally with respect to the nest so that when the door moves upwardly to the position shown in Fig. 3 the latch will move before a downwardly bent portion 59 on the door whereby outward movement of the door will be prevented until the latch is again actuated by the platform 55. It will be observed that in order that the latch may gravitate to the position shown in Fig. 3 that a portion of the side of the door is cut away as shown at 60.

In order that the door will automatically close after the laying fowl leaves the nest and the latter moves to the position shown in Fig. 2, a cross piece 61 is provided which coöperates with a shoe 62 on the outer face of the door. These parts are so constructed that the cross piece 61 will form a stop for the downward and outward movement of the door after the latter has been released in the manner before described, and when the forward end portion of the nest moves upwardly by virtue of the engagement between the parts 61 and 62 the door will be moved to the position shown in Fig. 3.

The rear or entrance end portion of the casing c supports a pair of doors 63, 63 best shown in Figs. 1, 2 and 4. These doors are self-closing and have hooks 64 which engage eyes 65 and are arranged so as to swing on an inclined axis on the rear uprights 31. The lower inner corner portions of the doors are engaged by the upper rear corners of the nest 28 when the latter is in the position shown in Figs. 1 and 2, and since these upper rear corners of the nest extend outwardly beyond the uprights 31 the doors will be held in open position as shown so that when a fowl enters the nest and the forward end portion moves downwardly, as before described, and the upper rear corners move between the uprights 31 the doors will gravitate to closed position as shown by dotted lines in Fig. 4. It will be seen that the combined widths of the doors 63 is somewhat less than the width of the rear end portion of the casing so that when the doors are closed a space will exist between their adjacent sides. This space is insufficient to permit the passage of a fowl therethrough from the outside, but is sufficiently large to attract the attention of a fowl in the nest so that in the event of the fowl's not laying an egg this space will suggest a means of exit so that when the fowl projects her head therethrough the doors 63 will yield outwardly to permit the fowl to leave the nest.

In order to prevent the fowl leaving the nest through the doors 63 after an egg has been laid I provide a lock, the construction of which is best shown in Figs. 2, 3 and 4. The lock comprises a rod 66 journaled in brackets 67 secured to the upper cross piece 49 and a rear upper cross piece 68. The forward end portion of the rod extends a trifle beyond the frame for the door 46 and terminates in a crank 69 to which is pivotally secured one end portion of a link 70. The link 70 extends vertically downward and terminates in an upturned portion 71 adapted to be engaged by the door 46 as the latter moves downwardly and outwardly in a manner before described, and when so engaged the link 70 will move downwardly whereby the rod 66 will be turned. The rear end portion of the rod 66 terminates in a lateral extension 71′ which extends across the opening for the rear doors 63. The normal position of the extension 71′ is a trifle below the upper ends of the doors 63 so that when the nest is occupied and the doors are closed in the manner before described, the said doors will bear upon the extension 71′ and the latter will directly underlie hooks 72, 72 at the upper outer corners of the doors. Thus it will be seen that when the door 46 moves downwardly and outwardly and the rod 66 is rocked the extension 71′ will move upward to the position shown by dotted lines in Fig. 4 and into engagement with the hooks 72, whereby the doors will be locked against outward movement until the fowl leaves the nest through the forward end portion thereof, whereby the portion 71′ will gravitate to the position shown in full lines in Fig. 4, thus permitting the nest to move the doors to the position shown in Figs. 2 and 4. Downward movement of the portion 71′ is limited by virtue of a bent portion 73 at the lower end of the link 70. This portion 73 abuts against a guide 74 arranged on the lower cross piece 47 as shown in Fig. 3.

The egg separator is made up of a receptacle 75 interiorly divided into a plurality of compartments 76. A frame 77 is provided above the receptacle 75 and bears on the upper edge thereof and has pivoted thereto a plurality of doors 78. The pivots of the doors 78 are in alinement with the compartments 76 which the doors overlie and portions of the doors bear one upon the other as shown in Fig. 5, the uppermost door or that nearest to the exit for the eggs from the nest being supported by a suitable plate carried by the frame 77, as shown in Figs. 1 and 5. The overlapping portions of the doors 78 extend to points beyond the pivots 79 thereof. In Fig. 5 I have shown three of these doors, and it will be seen that when the egg moves onto the end portion of the door adjacent to the end of the separator that one end portion of this door will be moved downwardly, whereby the egg will be precipitated into the compartment therebelow and the lower end portion of the door will be arranged between the egg and the inner wall 80 of the compartment, whereby the door will form a stop for the succeeding egg, which latter will tilt the intermediate door and fall into the intermediate compartment. This operation will be continued until all the compartments 76 are filled. It will be seen that the casing c is provided with a cover 81 and side walls 82, these parts serving to house the fowl while on the nest.

In arranging the parts the forward end portion of the nest member is placed adjacent to the contracted entrance end portion 83 of the runway so that when the door 46 moves downwardly and outwardly it will extend into the portion 83 of the runway, whereby an unobstructed passage will be established between the interior of the nest and the runway 5. The egg separator is placed between the nest member and segregator and so positioned that an egg moving from the platform 55 after the latter has been tilted in the manner before described will pass onto the frame 77. It might here be stated that the egg separator is so constructed that it will incline as shown in Fig. 5 so that the eggs will readily roll on the cover and into compartments in the manner before described.

In use the parts occupy the positions shown in Fig. 1 and referring to this figure it will be seen that when a fowl enters the nest the doors 63 will close as shown by dotted lines in Fig. 4. In the event of the fowl's laying an egg the latter will pass to the compartment on the right in Fig. 5; the door 46 will now be moved to open position, whereupon the fowl will pass into the runway 5 and against the portion 13 of the lever and into the first compartment. This operation will be repeated upon the succeeding fowl's laying an egg and after the said fowl has passed into the runway 5 and into the second compartment the door of the latter will be closed in the manner described for the first door. It will be seen that the second egg will be received by the intermediate receptacle 76 so that when all the compartments of the segregator and egg separator are filled respectively with the fowl and eggs the egg of each fowl can be readily ascertained, whereby any particular fowl may be treated for well known purposes.

Having thus described my invention what I claim as new, and desire to secure by Letters-Patent is:

1. In a device of the class described, in combination, a segregator having a plurality of compartments, means adapted to close each of said compartments after a fowl has moved thereinto, an egg separator having compartments, and a nest member adapted to direct eggs deposited therein onto the egg separator.

2. In a device of the class described, in combination, a segregator having a plurality of compartments, means for closing each of said compartments after a fowl has moved therein, an egg separator having compartments corresponding in number to those of the segregator, and a nest member adapted to direct eggs deposited therein onto the egg separator.

3. In a device of the class described, in combination, a segregator having a plurality of compartments, means for closing each of said compartments after a fowl has moved thereinto, an egg separator having a plurality of compartments, a nest member normally out of communication with the segregator and adapted to direct eggs deposited therein onto the egg separator, and means adapted to be operated to establish communication between the nest and segregator after an egg has been deposited in the nest.

4. In a device of the class described, in combination, a segregator having a plurality of compartments, means for closing each of said compartments after a fowl has moved thereinto, an egg separator having a plurality of compartments, a nest member normally out of communication with the segregator and adapted to direct eggs deposited therein onto the egg separator, and means adapted to be operated to establish communication between the nest and segregator after an egg has been deposited in the nest, said means being further adapted to be operated to cut off communication between the nest and segregator when a fowl leaves the nest.

5. In a device of the class described, in combination, a segregator having a plurality of compartments, self actuating closures for the compartments, nest member adapted to permit the passage of fowls therefrom one at a time into the segregator, and means for holding the said closures in open position and operated successively to release the closures, substantially as described.

6. In a device of the class described, a segregator having a passage-way and a compartment, a door extending across the passageway for directing a fowl from said passage-way into said compartment and for closing said compartment after the fowl has entered the same, and means, for holding said door open, adapted to be released by a fowl moving into the compartment.

7. In a device of the class described, a segregator having a plurality of compartments, a passage-way leading thereto, each compartment being provided with a self-closing door arranged to extend across the passageway when in open position, and means, for holding said doors open, adapted to be released by fowls moving in said passage-way.

8. The combination with a nest, of a segregating device comprising a runway, a pen, a door for closing the pen, said door being adapted to open across the runway and direct a fowl into said pen, a hinged prop arranged to hold the door open, and means for latching the door when closed.

9. The combination with a nest, of a runway, a plurality of pens, doorways connecting the pens with the runway, doors for said doorways adapted to swing across the runway, means tending to normally close the doors, hinged props for holding the doors open, the said props extending across the runway and in the path of the hens passing through the runway to the pens.

10. The combination with a nest, of a runway and a pen at one side of the runway, a door adapted in one position to close the runway and in another position to close the pen, a prop for holding the door to close the runway, said prop being adapted to swing automatically into its operative position, and a latch for holding the door when it closes the pen.

11. The combination with a nest and a runway, of a pen connecting with the runway by a doorway, a door adapted to close said doorway and normally tending to swing to closed position, means for latching the door when closed, and means for simultaneously unlatching and opening the door, said latter means comprising a rocking bar having an arm for opening the door.

12. The combination with a nest, of a runway, a pen at one side of the runway, a door normally tending to close communication between the runway and the pen, a rocking bar having an arm adapted to open the door when the bar is rocked, a latch connected to said bar and adapted to secure the door in closed position, the bar being adapted to raise the latch to unlock the door when it is rocked to open the door.

13. The combination with a nest, of a runway, a segregating pen at one side of the runway and communicating therewith by a doorway, a door provided with means constantly tending to close the same, a prop normally tending to swing into position to hold the door open, a rocking bar having an arm arranged to open the door when the bar is rocked, and a latch pivotally connected with the bar and carried thereby, substantially as and for the purpose set forth.

14. In a device of the class described, the combination of a segregator having a plurality of successively arranged pens, a run-way communicating with said pens, an egg separator having compartments corresponding to the pens, and a nest adapted to deliver the eggs to said separator and to permit the fowls, after laying, to enter said run-way, said parts being so constructed and arranged that each fowl will be confined in the pen corresponding to the compartment in which its egg has been deposited.

15. In a device of the class described, the combination of a pivotally mounted nest having over-balancing means whereby one end has a normal tendency to be elevated and is adapted to be depressed by a fowl on the nest, a casing surrounding said nest, a normally closed exit door having its bottom edge hinged to said casing, and means connecting said nest and said door whereby the latter is raised into closed position when said end is elevated by said overbalancing means and remains closed when the nest moves in the reverse direction.

16. In a device of the class described, the combination of a casing, a nest pivoted to one end of said casing, a counterbalancing member normally tending to lift the nest on its pivot, a normally closed exit door arranged at one end of said casing, a cam member on said door, and means connected with said nest and engaging said cam member whereby said door is closed when said nest is elevated by said counterbalancing member.

In testimony whereof I affix my signature in presence of two witnesses.

LEE T. OWENS.

Witnesses:
 GRACE D. ANDERSON,
 A. C. YOUNG.

Copies of this patent may be obtained for five cents each, by addressing the "Commissioner of Patents, Washington, D. C."